May 19, 1936.  F. E. RICE  2,041,371

BEER FAUCET

Filed June 5, 1934

INVENTOR
Frank E. Rice

BY

ATTORNEYS

Patented May 19, 1936

2,041,371

UNITED STATES PATENT OFFICE 2,041,371

BEER FAUCET

Frank E. Rice, Detroit, Mich.

Application June 5, 1934, Serial No. 729,051

8 Claims. (Cl. 251—42)

The present invention pertains to a novel faucet of a type particularly adapted for dispensing beverages.

The primary object of the present invention is to provide a faucet including a valve body formed with rack teeth and a gear sector meshing with the rack teeth so that rotation of the sector causes the valve body to be moved to or from a valve seat. In such faucets it is desirable that the valve body be easily removed so that in case it becomes worn or otherwise defective it may be replaced by persons not skilled in such operations. Accordingly the invention includes means associated with the sector, so that by manipulation of a handle connected to the sector when a sealing nut is removed, the valve body may be moved to a position where it may be grasped by a person's fingers to extract the same, and when it is desired to insert another valve body the same means serves as an indexing means to insure proper meshing of the gear sector with the rack teeth in the valve body.

With these objects in mind reference will be had to the accompanying drawing in which Figure 1 is a side elevation;

Figure 1:
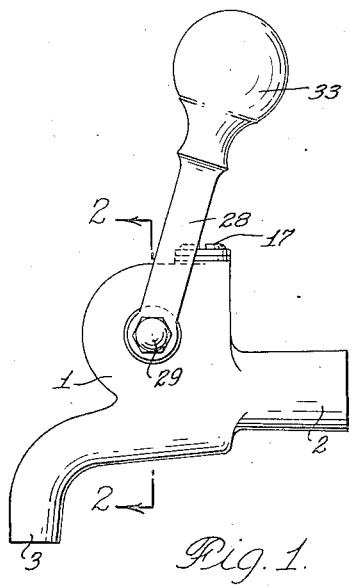
Figure 2:
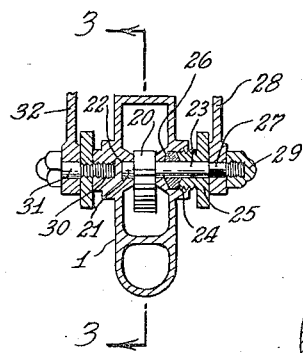
Fig. 2 is a cross section taken on the line 2—2 of Fig. 1.
Figure 3:
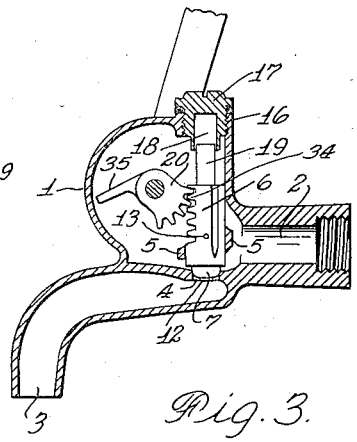
Fig. 3 is a cross section taken on the line 3—3 of Fig. 2.
Figure 4:
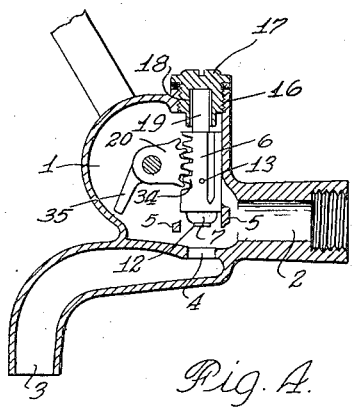
Figs. 4 and 5 are cross sections similar to Fig. 3 and illustrating different stages in the operation.

The numeral 1 designates a faucet housing formed with an inlet port 2 and an outlet port 3. Communication between the inlet 2 and outlet 3 is had through a passage 4 which serves as a valve seat and will hereinafter be termed the valve seat. Slidably received in the housing 1 and in guides 5 is a valve body 6 having a resilient head 7 on its lower end, the head 7 preferably being formed of rubber. In order to secure the flexible head 7 in place on the valve body 6 the latter is provided with an axial bore 8 opening through its lower end, the lower end being countersunk as at 9. The flexible head 7 is received in the countersunk portion of the valve body and projects therefrom and is provided with an axial bore 10. A pin 11 having a large head 12 is inserted in the bores 10 and 8 so that the head 12 bears against the bottom of the valve head 7 and the pin 11 is held in this position by a retainer 13 received in a transverse bore 14 in the valve body 6 and extending through a transverse bore 15 in the pin 11.

The faucet housing 1 is provided with a screwthreaded bore 16 co-axial with the valve seat 4 and received in the bore 16 is a plug 17 having an axial bore 18. The upper end of the valve body 6 is provided with a pilot 19 and when the valve body 6 is inserted in the housing 1 so that it is received in the guides 5, and the plug 17 then screwed into the bore 16, the pilot 19 extends into the bore 18 in the plug. It will be noted that the bore 18 and pilot 19 are so dimensioned that a clearance exists between the sides of the two and that the valve body 6 when so installed is co-axial with the valve seat 4 so that the valve head 7 may seat on the valve seat 4.

A gear sector 20 has an integral spindle 21 received in a bearing 22 in one of the sides of the housing 1, and an integral spindle 23 extending through an opening 24 in the opposite side wall. A plug collar 25 on the spindle 23 is screwthreaded into the opening 24 and serves to compress a packing 26. The outer end of the spindle 23 is squared as at 27 and receives a handle part 28, a nut 29 on the end of the spindle 23 being provided to retain the handle part 28 on the squared portion. In the side wall opposite to that in which the opening 24 is formed there is provided a screwthreaded bore 30 receiving a bolt 31 for supporting another handle part 32. The two handle parts 28 and 32 are connected to a handle 33.

The valve body 6 is provided with rack teeth 34 and the gear sector 20 meshes therewith so that upon rotation of the sector by manual pressure on the handle 33 the valve body 6 may be moved to carry the valve head 7 to or from engagement with the valve seat 4.

Figure 5:
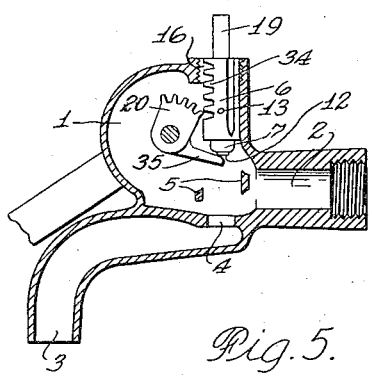
Figure 6:
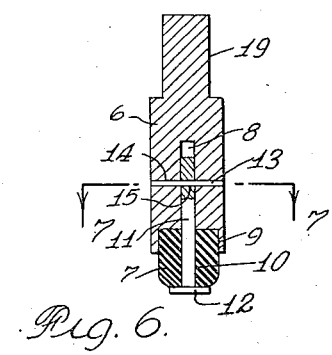
Fig. 6 is a cross section of the valve body.
Figure 7:
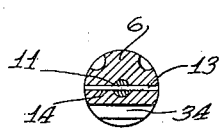
Fig. 7 is a cross section taken on the line 7—7 of Fig. 6.

The sector 20 is provided with an outwardly extending arm 35, the purpose and function of which will become apparent upon reference to Fig. 5. In this view the plug 17 has been removed and the handle has been moved to rotate the gear sector so that it no longer meshes with the teeth 34 on the valve body 6. At this time the arm 35 has been carried to a position where it is beneath the valve body so as to prevent it from falling by force of gravity into engagement with the valve seat 4. Continued movement of the sector will move the arm 35 so that it will cause the valve body to be projected through the bore 16.

If it is assumed, with the parts illustrated as in Fig. 5, that the valve body 6 is being inserted into the housing, it will be noted that the valve body in striking the arm 35 serves as an indexing means for causing the proper intermeshing of the gear sector with the rack teeth on the valve body.

What I claim is:—

1. In a faucet, a housing formed with a valve seat, a valve in said housing co-operating with said seat, intermeshing means for moving said valve into and out of engagement with said seat, a limiting element in said housing restricting movement of said valve to maintain said intermeshing means in intermeshed relation, said limiting element being removable whereby said intermeshing means may be moved out of intermeshing relationship, and means connected to and movable with said intermeshing means for engaging said valve when said intermeshing means has been moved out of intermeshing relationship whereby continued movement of said intermeshing means imparts movement to said valve.

2. In a faucet, a housing formed with a valve seat, a valve plug in said housing, rack teeth on said plug, a manually movable sector gear normally meshing with said rack teeth, means in said housing for limiting movement of said plug to maintain said sector gear in mesh with said rack teeth, said means being removable to permit said sector gear and rack teeth to be moved out of mesh, and means carried by said sector and engaging said plug when said sector gear and rack teeth are out of mesh for imparting movement to said plug by rotation of said sector gear.

3. In a faucet, a housing formed with an opening, a valve plug adapted to be inserted through said opening, a rotatable sector gear in said housing, rack teeth on said plug, and means carried by said sector gear and extending into the path of movement of said valve plug as it is inserted into said housing whereby engagement of said plug therewith causes rotation of said sector gear to move the same into mesh with said rack teeth.

4. In a faucet, a housing formed with an opening, a valve plug adapted to be inserted through said opening, a rotatable sector gear in said housing, rack teeth on said plug, means carried by said sector gear and extending into the path of movement of said valve plug as it is inserted into said housing whereby engagement of said plug therewith causes rotation of said sector gear to move the same into mesh with said rack teeth, and removable means for maintaining said sector gear in mesh with said rack teeth.

5. In a faucet, a housing formed with an opening and a valve seat, a valve plug in said housing with one end adjacent to said opening, intermeshing means for moving said plug relative to said seat, an element received in said opening in said housing and engaging said plug to restrict movement thereof to maintain said intermeshing means in intermeshing relationship, said element being removable to permit unrestricted movement of said plug to move said intermeshing means out of intermeshing relationship, and means connected to and movable with said intermeshing means for engaging and imparting movement to said plug when said parts are out of intermeshing relationship whereby continued movement of said intermeshing means projects the end of said plug through said opening.

6. In a faucet, a housing formed with an opening and a valve seat, a valve plug in said housing with one end adjacent to said opening, rack teeth on said plug, a manually movable sector gear in said housing normally meshing with said rack teeth, means received in said opening for restricting movement of said plug to maintain said sector gear in mesh with said rack teeth, said means being removable to permit movement of said rack teeth and sector gear out of mesh, and means carried by said sector and engaging said plug after said rack teeth and sector gear are out of mesh for imparting movement thereto to project the end of said plug through said opening.

7. In a faucet, a valve plug having rack teeth thereon, a manually rotatable sector gear normally meshing with said rack teeth whereby rotation of said sector causes movement of said plug, said sector being adapted to be moved out of mesh with said rack teeth by continued movement thereof, and means carried by said sector for engaging said plug after the sector is out of mesh with said rack teeth whereby additional rotative movement of said sector imparts an additional amount of movement to said plug.

8. In a faucet having a reciprocable valve plug and an opening through which said valve plug may be removed from said faucet, manual movable means adapted to operatively engage said plug to impart movement thereto, said manual means being adapted to be moved out of operative engagement with said plug by a predetermined amount of movement, an element received in said opening for limiting the movement of said plug and manual means to maintain said manual means in operative engagement with said plug, said element being removable to permit said manual means to be moved out of operative engagement with said plug, and means rendered operative after said manual means becomes inoperative for imparting movement to said plug to project the end thereof through said opening.

FRANK E. RICE.